United States Patent
Matus

(10) Patent No.: US 9,628,464 B2
(45) Date of Patent: *Apr. 18, 2017

(54) MOBILE-DEVICE USER AUTHENTICATION

(71) Applicant: Facebook, Inc., Menlo Park, CA (US)

(72) Inventor: Jonathan Arie Matus, San Francisco, CA (US)

(73) Assignee: FACEBOOK, INC., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/662,854

(22) Filed: Mar. 19, 2015

(65) Prior Publication Data

US 2015/0264029 A1  Sep. 17, 2015

Related U.S. Application Data

(63) Continuation of application No. 13/205,446, filed on Aug. 8, 2011, now Pat. No. 9,015,856.

(51) Int. Cl.
*G06F 21/62* (2013.01)
*H04L 29/06* (2006.01)
*G06F 21/34* (2013.01)
*H04W 4/20* (2009.01)
*H04W 12/06* (2009.01)

(52) U.S. Cl.
CPC ............. *H04L 63/08* (2013.01); *G06F 21/34* (2013.01); *G06F 21/62* (2013.01); *H04W 4/206* (2013.01); *H04W 12/06* (2013.01)

(58) Field of Classification Search
CPC ....................................................... H04L 63/10
See application file for complete search history.

(56) References Cited

U.S. PATENT DOCUMENTS

| | | | |
|---|---|---|---|
| 7,356,694 B2 * | 4/2008 | Mayo ................. | H04L 63/0815 713/159 |
| 2002/0087632 A1 * | 7/2002 | Keskar ................. | H04L 67/306 709/204 |
| 2007/0289000 A1 * | 12/2007 | Weiss ..................... | G06F 21/32 726/5 |
| 2008/0010457 A1 * | 1/2008 | Lee ......................... | G06F 21/10 713/169 |
| 2008/0082445 A1 * | 4/2008 | Watanabe ............... | G06F 21/10 705/51 |
| 2011/0154215 A1 * | 6/2011 | Raley ..................... | G06F 21/10 715/744 |
| 2012/0214449 A1 * | 8/2012 | Jordan ............. | H04M 3/42357 455/414.1 |
| 2013/0247117 A1 * | 9/2013 | Yamada ................. | G08C 17/02 725/93 |
| 2014/0082074 A1 * | 3/2014 | Workman ............... | H04L 67/10 709/204 |

* cited by examiner

*Primary Examiner* — Josnel Jeudy

(57) ABSTRACT

In one embodiment, receiving a notice from a first user associated with a first mobile device indicating that the first user wishes to share information of the first user with one or more second users respectively associated with one or more second mobile devices; accessing information known about one or more users and one or more mobile devices respectively associated with the one or more users; identifying at least one candidate for the first user based on the information known about the one or more users and the one or more mobile devices; and confirming one or more of the at least one candidate as the one or more second users.

21 Claims, 4 Drawing Sheets

MOBILE-DEVICE USER AUTHENTICATION

CROSS-REFERENCE TO RELATED APPLICATIONS

The present application is continuation of and claims priority to U.S. patent application Ser. No. 13/205,446, entitled "Mobile-Device User Authentication" and filed Aug. 8, 2011, the entirety of which is incorporated herein by reference.

TECHNICAL FIELD

This disclosure generally relates to mobile devices and more specifically relates to authenticating mobile-device users for exchanging information and other social applications.

BACKGROUND

Mobile devices, such as mobile telephones (e.g., feature phones and smart phones), personal digital assistants (PDA), and mobile computers (e.g., tablet, netbook, and notebook computers), have become prevalent in people's daily lives. Many such devices are capable of supporting a variety of functionalities. Often, people carry relatively small and yet highly versatile mobile devices with them as they go through their daily lives (e.g., visit different places, participate in different events, perform different activities, etc.), and these mobile devices become extremely useful tools that bring convenience and flexibility to people's lives.

SUMMARY

This disclosure generally relates to mobile devices and more specifically relates to authenticating mobile-device users for exchanging information through the mobile devices.

In particular embodiments, receiving a notice from a first user associated with a first mobile device indicating that the first user wishes to share information of the first user with one or more second users respectively associated with one or more second mobile devices; accessing information known about one or more users and one or more mobile devices respectively associated with the one or more users; identifying at least one candidate for the first user based on the information known about the one or more users and the one or more mobile devices; and confirming one or more of the at least one candidate as the one or more second users.

These and other features, aspects, and advantages of the disclosure are described in more detail below in the detailed description and in conjunction with the following figures.

DETAILED DESCRIPTION

Figure 1:
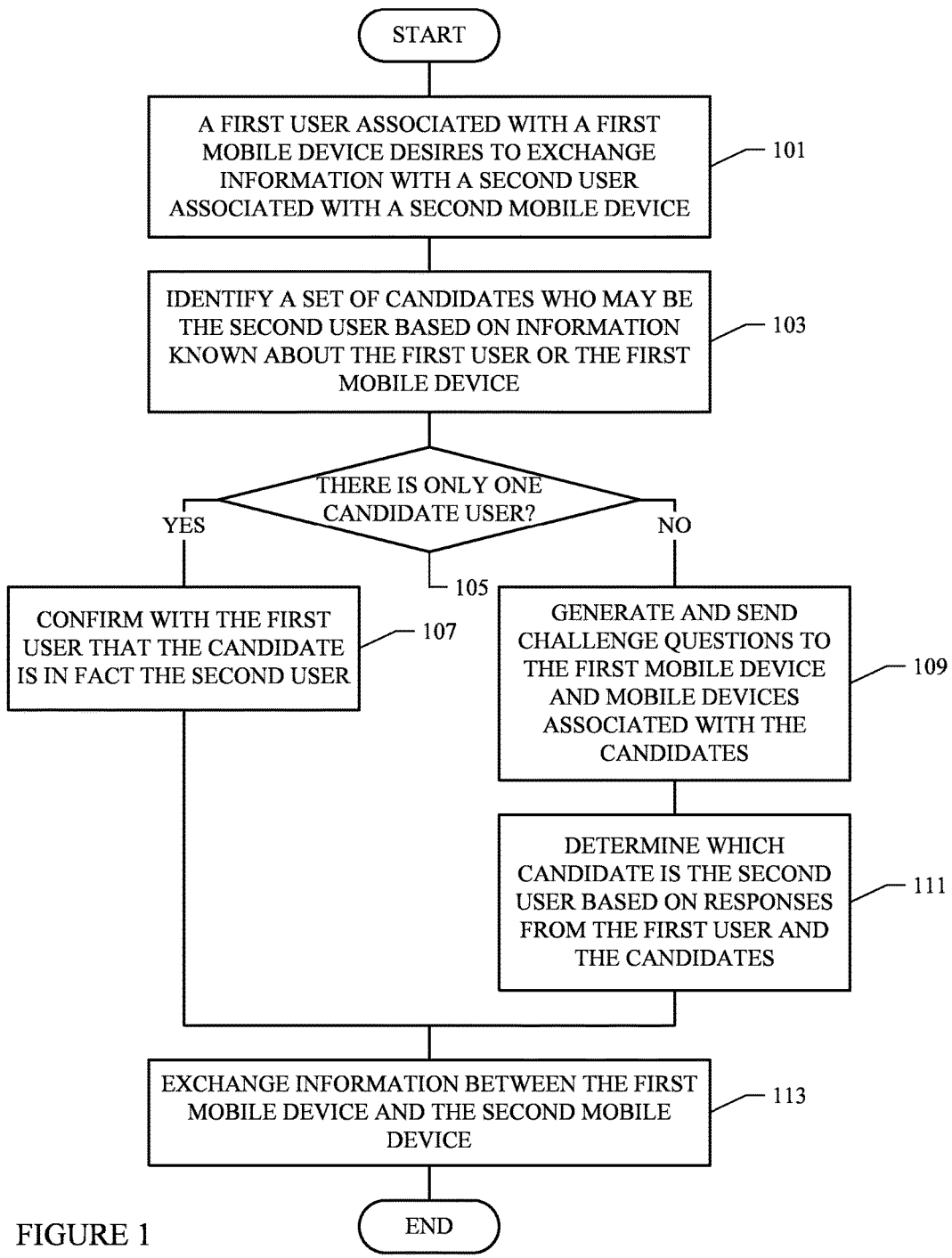
FIG. 1 illustrates an example method for authenticating mobile-device users.

This disclosure is now described in detail with reference to a few embodiments thereof as illustrated in the accompanying drawings. In the following description, numerous specific details are set forth in order to provide a thorough understanding of this disclosure. However, this disclosure may be practiced without some or all of these specific details. In other instances, well known process steps and/or structures have not been described in detail in order not to unnecessarily obscure this disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

Present-day mobile devices, such as mobile telephones (e.g., feature phones and smart phones), personal digital assistants (PDA), and mobile computers (e.g., tablet, netbook, and notebook computers), are capable of performing a variety of functionalities, one of which is sending and receiving data. Even with basic, low-end mobile devices, some form of data may be sent to or received from another device. For example, a basic feature phone still has the capability of making telephone calls, and thus exchanging voice data with another telephone, as well as sending short text messages. A more sophisticated mobile telephone (e.g., a smart phone) often has the capability of exchanging digital data (e.g., texts, images, audios, videos, etc.). In addition, almost all mobile devices include some amount of memory (e.g., internal or add-on memory cards), which may be used to store information or data. Again, a basic feature phone still has the capability of storing contact names and telephone numbers, and a more sophisticated mobile telephone has even more memory for storing various types of information.

Sometimes, a group (e.g., two or more) of mobile-device users may wish to exchange information with each other. The information may be stored locally on the mobile devices and/or remotely on other devices (e.g., servers or databases). For example, when two people meet and become friendly with each other at a social event (e.g., a party), they may wish to exchange contact information (e.g., names, telephone numbers, email addresses, etc.) with each other so that they can contact each other in the future. Additionally or alternatively, they may wish to establish a connection in one or more social networking applications, such as initiating a friend request from one user to another.

Particular embodiments enable a group of mobile-device users to authenticate each other's identity and exchange information with each other using their respective mobile devices. With the above example where two people meet at a social event, instead of each person verbally telling the other person his/her telephone number and email address and the other person manually entering (e.g., typing) the telephone number and email address into his/her mobile device for record keeping, the two people's mobile devices may exchange their respective users' contact information automatically.

In order to ensure that the information of one user is sent to the mobile device of another user who is the correct user to receive such information, particular embodiments authenticate the identity of the user who is to receive the information before the information is sent.

Figure 2:
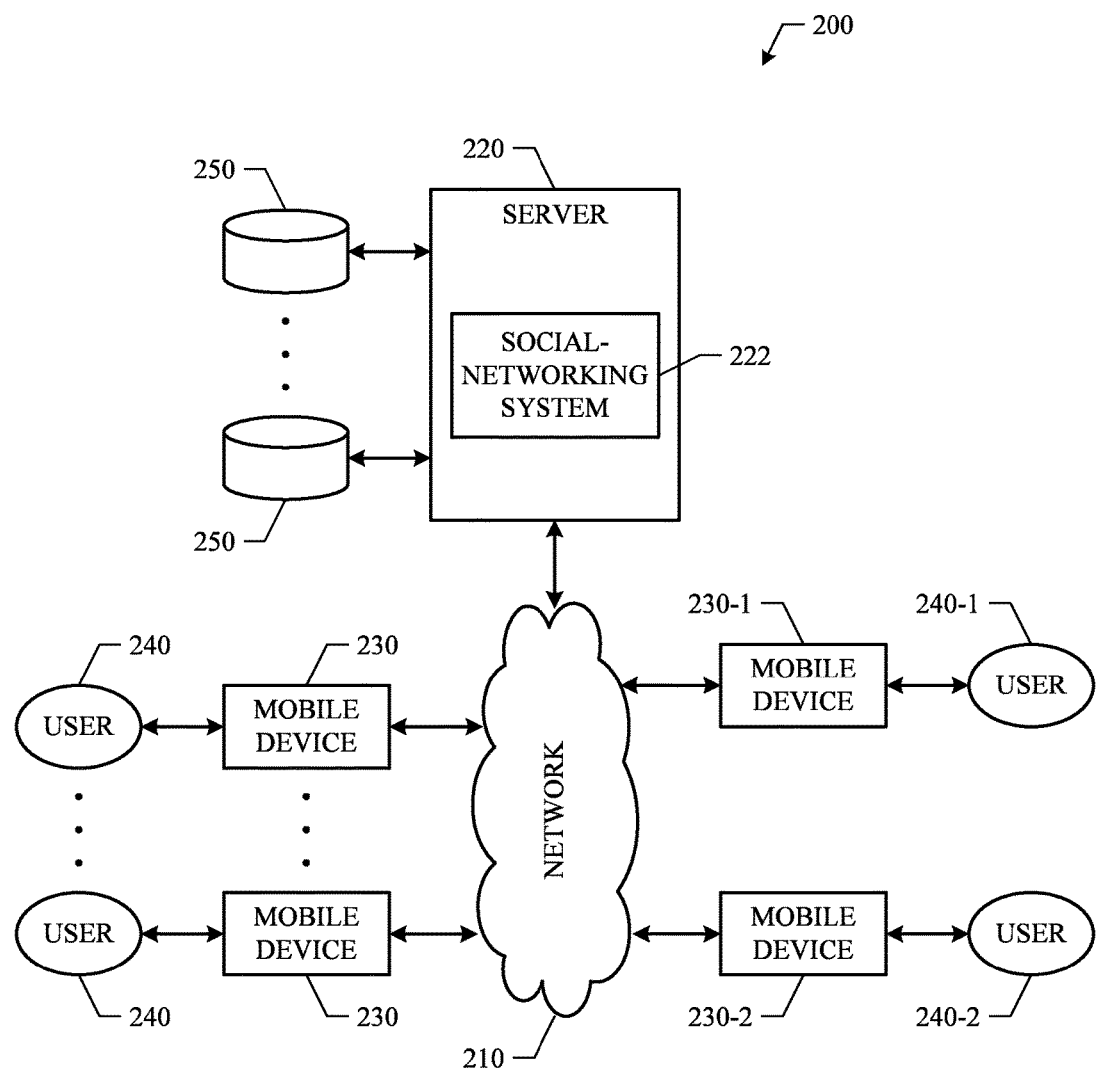
FIG. 2 illustrates an example system for authenticating mobile-device users.

FIGS. 1 and 2 illustrate an example method and system, respectively, for authenticating mobile-device users. FIGS. 1 and 2 are described in reference to each other. In particular embodiments, a group of mobile-device users may exchange information with each other through their respective mobile devices. There may be any number of users in the group. In addition, at any given time, there may be any number of groups of users exchanging information within the individual groups. Although the steps illustrated in FIG. 1 reference only two users, where a first user (i.e., an information sender) associated with a first mobile device is to send information to a second user (i.e., an information receiver) associated with a second mobile device, the concept may be similarly applied to more than two users and two mobile devices. Furthermore, the steps illustrated in FIG. 1 are from the perspective of the user sending the information (i.e., the information sender). When two users exchange information with each other, both users are information senders and information receivers at the same time, although with respect to different information.

In the example system 200 illustrated in FIG. 2, a number of mobile devices 230 is coupled to a computer or communication network 210. Each mobile device 230 is associated with a user 240. A user 240 is not necessarily a person, but may be any type of entity, including a person. For example, a mobile device 230 may be associated with a business (e.g., a restaurant) and operated by an employee of the business on its behalf. In this case, the business may be considered a "user" 240 associated with the mobile device 230.

Mobile devices 230 may be of different types (e.g., feature or smart phones, PDAs, tablet or netbook computers, etc.), and as a result, they may support different functionalities. For example, some mobile devices 230 may only have smaller, black-and-white screens and are only able to send and receive voice data, while other mobile devices 230 may have larger, color screens for displaying multimedia data (e.g., texts, images, and videos) and are able to send and receive voice as well as binary data. Particular embodiments are able to authenticate users 240 regardless of the specific type of mobile device 230 each user 240 has.

Suppose that a first user associated with a first mobile device desires to send the first user's information to a second user associated with a second mobile device, as illustrated in STEP 101 of FIG. 1. As an example, in FIG. 2, suppose that user 240-1 associated with mobile device 230-1 is the first user, and user 240-2 associated with mobile device 230-2 is the second user. Thus, user 240-1 wishes to send some of his/her information to user 240-2. With respect to the information of user 240-1, user 240-1 is the sender and user 240-2 is the receiver. In particular embodiments, before the information of user 240-1 is sent to user 240-2, the identity of user 240-2 is authenticated. User 240-2 may or may not wish to send some of his/her own information to user 240-1 at the same time. If user 240-2 also wishes to send some of his/her information to user 240-1, the identity of user 240-1 is similarly authenticated before the information user 240-2 is sent to user 240-1.

From the perspective of user 240-1, in particular embodiments, user 240-1 may declare, using mobile device 230-1, that he/she is in friendly mode and wishes to share some of his/her information with another user (e.g., user 240-2). In particular embodiments, user 240-1 may declare his/her intention of sharing some of his/her information with another user to a server by sending a predefined signal from mobile device 230-1 to the server. From the perspective of user 240-2, in particular embodiments, user 240-2 also needs to declare, using mobile device 230-2, that he/she is in friendly mode, in order to receive information from user 240-1, and optionally, to send some of his/her own information to user 240-1 at the same time. Similarly, user 240-2 may declare his/her intention of sharing information with another user (e.g., user 240-1) to the server by sending the predefined signal from mobile device 230-1 to the server. In particular embodiments, the server may host a social-networking system, and both user 240-1 and user 240-2 are members of the social-networking system.

A social network, in general, is a social structure made up of entities, such as individuals or organizations, that are connected by one or more types of interdependency or relationships, such as friendship, kinship, common interest, financial exchange, dislike, or relationships of beliefs, knowledge, or prestige. In more recent years, social networks have taken advantage of the Internet. There are social-networking systems existing on the Internet in the form of social-networking websites. Such social-networking websites enable their members, who are commonly referred to as website users, to perform various social activities. For example, the social-networking website operated by Facebook, Inc. at www.facebook.com enables its users to communicate with their friends via emails, instant messages, or blog postings, organize social events, share photos, receive news of their friends or interesting events, play games, etc.

In FIG. 2, a server 220 is also coupled to network 210. Server 220 may host a social-networking system 222 implemented as a social-networking website. In particular embodiments, a number of data stores 250 may be coupled to server 220 for storing information of social-networking system 222, such as its members' profiles, social connections, activities, or any other type of information collected by social-networking system 222. Users 240 may all be members of social-networking system 222. When user 240-1 wishes to share some of his/her information with user 240-2, user 240-1 may send a predefined signal to server 220 using mobile device 230-1, declaring this intention.

In particular embodiments, upon receiving the friendly-mode signal from mobile-device 230-1, server 220 generates a unique token for user 240-1. This token has a relatively short expiration period (e.g., 5 to 10 seconds). In addition, server 220 may collect or access as much information known about user 240-1 and mobile device 230-1 as possible, either from mobile device 230-1 or from information stored in data stores 250 in connection with social-networking system 222.

For example, if mobile device 230-1 has a location sensor (e.g., GPS (global positioning system) sensor), then the current location of mobile device 230-1, and thus the current location of user 240-1, may be determined based on the location sensor data (e.g., latitude and longitude) supplied by the location sensor. If mobile device 230-1 is a mobile telephone, then its wireless signal may be triangulated to determine the current location of mobile device 230-1, and thus the current location of user 240-1. If user 240-1 has checked in at an event or a place (e.g., using the Facebook "check in" function) shortly before declaring himself/herself in friendly mode, then the current location of user 240-1 may be determined based on the information of the event or place (e.g., the location of the event or place is the same as the current location of user 240-1). If the social calendar of user 240-1 (e.g., the social calendar provided by social-networking system 222) indicates that user 240-1 is scheduled to attend an event or a social function at the time user 240-1 declares himself/herself in friendly mode, the location of the event or social function may be the current location of user 240-1.

In particular embodiments, when user 240-1 declares himself/herself in friendly mode, the identity (e.g., user ID (identifier)) of user 240-1 may be sent to server 220 at the same time. Based on this user ID, server 220 may access social information contained in social-networking system 222 relevant to user 240-1. In particular embodiments, all the information of social-networking system 222 may be organized into a social graph having a number of nodes and a number of edges, where each edge connects two nodes. Each node may represent an entity, which may be human (e.g., a user 240 of social-networking system 222) or non-human (e.g., location, event, action, business, object, message, post, image, web page, news feed, etc.). Two nodes are connected with an edge if the two nodes are related in some way (i.e., there is a relationship between the two nodes). Example cases when two nodes in the social graph are considered related and thus connected with an edge may include, without limitation, (1) the two nodes represent two users 240 of social-networking system 222 respectively, and the two users 240 are socially connected (e.g., friends of each other); (2) the two nodes represent a user 240 of social-networking system 222 and an event respectively, and the user 240 has attended or is attending the event; (3) the two nodes represent a user 240 of social-networking system 222 and a location, and the user has been to the location; (4) the two nodes represent a user 240 of social-networking system 222 and a web page respectively, and the user 240 has interacted with (e.g., viewed) the web page; (5) the two nodes represent an event and a location respectively, and the event is held at the location; (6) the two nodes represent a user 240 of social-networking system 222 and an image (e.g., a digital photograph) respectively, and the user 240 is in the image; (7) the two nodes represent a user 240 of social-networking system 222 and a product (e.g., a mobile telephone) respectively, and the user 240 owns and uses the product or is interested in the product or has reviewed the product; and (8) the two nodes represent a user 240 of social-networking system 222 and a software application (e.g., a web-based game) respectively, and the user 240 uses the application (e.g., plays the game). A connection may exist between two humans, a human and a non-human entity, and two non-human entities. Any type of relationship between two human or non-human entities may result in a connection between the two entities.

When there is an edge between two specific nodes, the two nodes may be considered directly related. When there is no edge between two particular nodes, the two nodes may still be considered indirectly related (e.g., related through other nodes). The closer two nodes are connected, the closer they are considered being related. The term "degree of separation" may be used to indicate how closely two nodes are related. If two nodes are directly connected, there is one degree of separation between them. If two nodes are indirectly connected through one other node, there are two degrees of separation between them. If two nodes are indirectly connected through two other nodes, there are three degrees of separation between them. And so on.

Since user 240-1 is a member of social-networking system 222, one of the nodes in the social graph represents user 240-1. Similarly, other nodes in the social graph represent other users 240, respectively. Server 220 may locate the node in the social graph that represents user 240-1 (e.g., using the user ID of user 240-1) and determine what other nodes are relatively closely related to the node representing user 240-1, and what entities these other nodes represent.

During any period of time (e.g., any 10-second window), there may be any number of users 240 declaring that they are in friendly mode and wish to share their information with other users, including user 240-2 and some of the other users 240. In particular embodiments, server 220 may maintain a data structure (e.g., a table) that contains all users 240 currently in friendly mode. The following illustrates an example table.

| USER ID | Session ID | Time Stamp | User Data |
| --- | --- | --- | --- |
| Adam | 59578 | 12:58:23 | ... |
| James | 39175 | 12:58:21 | ... |
| ... | ... | ... | ... |

Information of Users Who are in Friendly Mode

In this example, "User ID" is the user ID (e.g., with social-networking system 222) of each user 240 who is currently in friendly mode. "Session ID" is the unique token generated for each user 240 by server 220 when that user 240 declares to server 222 that he/she is in friendly mode. "Time Stamp" is the time when the token of each user 240 expires (e.g., 10 seconds after time when the token is generated). "User Data" is the information each user 240 wishes to share with other users 240. Each time server 220 receives a signal from a specific user 240 declaring himself/herself in friendly mode, this user 240 is added to the table. When the token of a user 240 has expired, this user 240 is deleted from the table.

In particular embodiments, in response to the friendly-mode signal received from mobile device 230-1 associated with user 240-1, server 220 may identify a set of candidates (i.e., other users 240) who may be the users (e.g., user 240-2) to whom user 240-1 desires to send some of his/her information, based on the known information about user 240-1 and/or mobile device 230-1, as illustrated in STEP 103 of FIG. 1. Different types of information may be analyzed to obtain different clues about the candidates.

For example, user 240-1 typically shares his/her information with another user 240 who is currently with user 240-1 (i.e., at the same location as user 240-1). If the current location of user 240-1 is known (e.g., based on the location sensor data provided by mobile device 230-1, the wireless signals of mobile device 230-1, the social calendar of user 240-1 and the current time, the check-in made by user 240-1, etc.), then a candidate should be another user 240 who is currently at the same location as user 240-1 (e.g., those users 240 attending the same event or in the same establishment as user 240-1 who also are associated with a unexpired friendly signal or token), which means all those users 240 who are not currently co-located with user 240-1 should not be selected as candidates for user 240-1. The current locations of other users may be determined similarly as the current location of user 240-1.

If user 240-1 and user 240-2 wish to exchange information with each other (e.g., exchange their respective contact information), then both user 240-1 and user 240-2 probably declare themselves in friendly mode at approximately the same time. In this case, a candidate for user 240-1 should be another user 240 who is currently in friendly mode as well (e.g., another user contained in the table maintained by server 220), which means all those users 240 who are not in friendly mode when user 240-1 is in friendly mode should not be selected as candidates for user 240-1.

In some cases, the candidates for user 240-1 may be limited to a specific degrees of separation (e.g., two degrees of separation) from user 240-1 in the social graph of social-networking system 222. In real-life situations, a person (e.g., user 240-1) is more likely to become friendly and share his/her information with a friend of his/her own friend than a complete stranger. If a second user 240 and user 240-1 both are friends of a third user 240 in social-networking system 222 (i.e., the second user 240 and user 240-1 have two degrees of separation in the social graph), then this second user 240 may be selected as a candidate for user 240-1. Conversely, those users 240 who are far removed from user 240-1 in the social graph (e.g., having three or more degrees of separation) are not selected as candidates for user 240-1.

Some sophisticated mobile devices 230 may include components such as NFC (near field communication) chips or support Bluetooth or Wi Fi capabilities. For example, if both mobile device 230-1 and mobile device 230-2 have NFC chips, they may exchange information or signals for identification or authentication purposes (e.g., the user who is associated with the mobile device that is in close proximity with mobile device 230-1 is likely to be in close proximity with user 240-1, and thus is likely to be the user to whom user 240-1 wishes to send his/her information).

Figure 4:
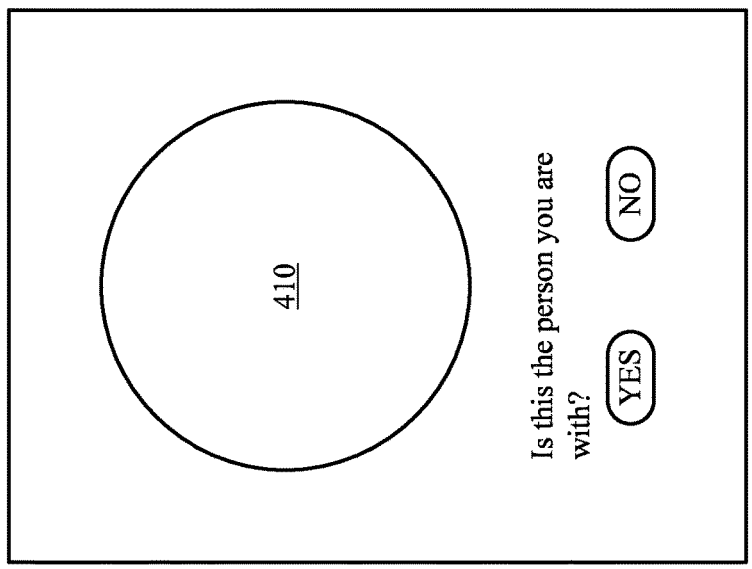

In particular embodiments, many different types of known information (e.g., location, time, social connections, social calendar, event chick-in, device capabilities, etc.) may be combined together to filter out users and reduce the number of possible candidates. In many cases, there are only a few possible candidates, or even just one possible candidate identified for user 240-1 after filtering out all the unlikely users. If there is only one possible candidate identified for user 240-1, as illustrated in STEP 105 (YES) of FIG. 1, then server 220 may confirm with user 240-1 whether this candidate is in fact the user (i.e., user 240-2) to whom user 240-1 wishes to send his/her information. For example, if mobile device 230-1 is capable of displaying images, server 220 may send an image of the candidate to mobile device 230-1 to be presented to user 240-1. FIG. 4 illustrates an example user interface that includes an image 410, which may be the image of user 240-2. This user interface may be displayed on the screen of mobile device 230-1. User 240-1 may be asked to confirm whether image 410 is in fact the image of user 240-2 using the "YES" or "NO" button.

Alternatively, if mobile device 230-1 is capable of displaying text, server 220 may send the name of the candidate to mobile device 230-1 (e.g., as a SMS message). If mobile device 230-1 is a feature phone with very limited capabilities, at the very least, server 220 may initiate a phone call to mobile device 230-1 and relay the name of the candidate over the telephone. If the candidate's image or name is of user 240-2, then user 240-1 may reply with an affirmative. If the candidate's image or name is not of user 240-2, then user 240-1 may reply with a negative, in which case no information of user 240-1 is sent to the mobile device 240 associated with the candidate.

On the other hand, if there are more than one possible candidates identified for 240-1, as illustrated in STEP 105 (NO) of FIG. 1, then server 220 may generate a set of challenge questions and send them to mobile device 230-1 associated with user 240-1 as well as those mobile devices 230 associated with the candidates, as illustrated in STEP 109 of FIG. 1. Since different users 240 may be associated with different types of mobile devices 240 having different capabilities, in particular embodiments, the challenge questions are selected based on the capabilities supported by the specific mobile devices 240 involved in each authentication process (e.g., mobile device 230-1 associated with user 240-1 and those mobile devices 230 associated with the candidates), which may take into consideration factors such as, for example and without limitation, the type of screen (e.g., black-and-white or color, low or high resolution, etc.) each mobile device 230 has, the type of data (e.g., text, image, video) that may be handled by each mobile device 230, and the hardware components available in each mobile device 230.

For example, suppose that all mobile devices 230 associated with user 240-1 and the candidates are capable of displaying images. In this case, the challenge questions may involve sending the images of user 240-1 and the candidates to each other's mobile devices 230 and ask them to identify the other party. Suppose that there are two possible candidates identified for user 240-1, and either candidate may be user 240-2. The image of user 240-1 may be sent to the mobile device 230 of each of the candidates for display, together with the question asking each candidate to identify whether the image is of user 240-1, the person who is currently with the candidate. At the same time, the images of the two candidates may be sent to mobile device 230-1 for display, together with the question asking user 240-1 to select the image of user 240-2, the person to whom user 240-1 wishes to send some of his/her information. If one of the candidates indicates that the image is of user 240-1, who is currently with that candidate, and user 240-1 also selects the image of that same candidate as user 240-2, then that candidate is authenticated as user 240-2. Again, the example user interface illustrated in FIG. 4 may be used to display the images and ask each user to confirm which image is of the other user with whom the user wishes to share information.

Suppose that all mobile devices 230 associated with user 240-1 and the candidates have color screens. In this case, the challenge questions may involve assigning user 240-1 and each candidate a unique color or a unique combination of colors. Again, suppose that there are two possible candidates identified for user 240-1. For example, user 240-1 may be assigned the color red; the first candidate may be assigned the color green; and the second candidate may be assigned the color blue. Each mobile device 230 is directed to display the color assigned to its user 240 (i.e., mobile device 230-1 displays red; the mobile device 230 associated with the first candidate displays green; and the mobile device 230 associated with the second candidate displays blue), together with the question asking each user 240 to identify the color displayed on the mobile device 230 of the other user 240 (i.e., user 240-1 is asked to identify the color displayed on mobile device 230-2 of user 240-2; and user 240-2 is asked to identify the color displayed on mobile device 230-1 of user 240-1). Further suppose that the first candidate is in fact user 240-2. Since user 240-1 and user 240-2 (i.e., the first candidate) are with each other, they can show each other the screen of their mobile devices 230 in order to correctly identify the color displayed thereon. The second candidate, on the other hand, is not with user 240-1, and thus cannot know what color is displayed on the screen of mobile device 230-1.

Figure 5:
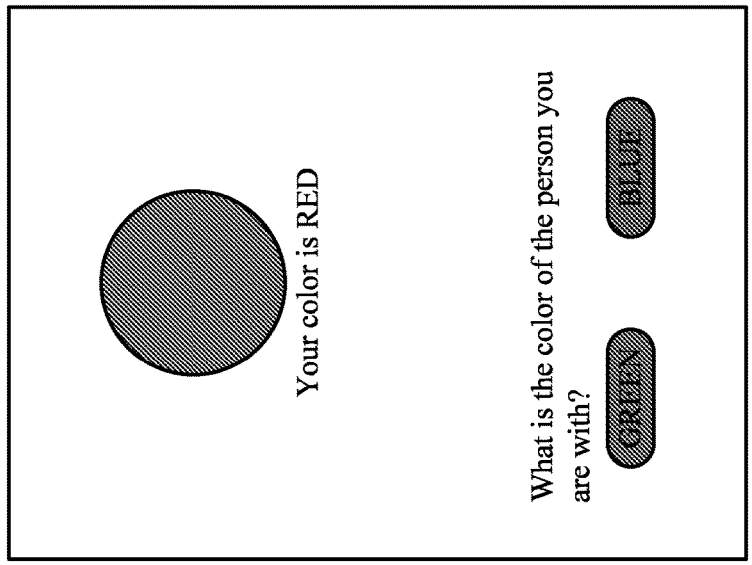
FIGS. 4 and 5 illustrate two example user interfaces, respectively.

FIG. 5 illustrates an example user interface that may be used to display the color assigned to each user 240 and ask each user 240 to respond with the color displayed on the screen of the other user 240 with whom the user 240 wishes to share information. The color (e.g., red) assigned to a user himself/herself is displayed near the top. The colors (e.g., green and blue) assigned to the other users are displayed near the bottom as clickable icons, and the user may select the appropriate color assigned to the other user with whom the user wishes to share information (e.g., by clicking on the correct color icon).

With basic mobile devices 230, such as feature phones, that do not support many capabilities, the challenge questions may be voice based. For example, a phone call may be initiated to the feature phone of each user 240 involved in the authentication process with a unique tune or jingle, and each user 240 is asked to identify the tune or jingle sent to the feature phone of the other user 240 with him/her. Alternatively, a unique code (e.g., a password or a personal identification number (PIN)) may be sent to each phone, and each user 240 is asked to enter into his/her own phone the code sent to the phone of the other user 240 with him/her.

Note that in the above examples, user 240-1 and user 240-2 may share their respective information with each other. Thus, both user 240-1 and user 240-2 are authenticated at the same time (i.e., user 240-2 is authenticated in order to receive information from user 240-1, and user 240-1 is authenticated in order to receive information from user 240-2). If user 240-1 only sends his/her information to user 240-2, but user 240-2 does not send his/her information to user 240-1, then only user 240-2 needs to be authenticated in order to receive information from user 240-1. User 240-1 does not have to be authenticated at the same time. In this case, the challenge question may only need to be sent to user 240-2. Based on the answers to the challenge questions supplied by the candidates, server 220 may determine which candidate is in fact user 240-2 (i.e., the person to whom user 240-1 wishes to send some of his/her information), as illustrated in STEP 111 of FIG. 1.

For user 240-1, once user 240-2 has been successfully authenticated, the information of user 240-1 (e.g., as specified in the above example table) may be sent to mobile device 230-2 (e.g., by server 220), as illustrated in STEP 113 of FIG. 1. Any type of information may be shared among any number of users. For example, when two users wish to exchange their contact information, both users are authenticate for each other at the same time. Then each user's contact information is sent to the other user's mobile device. As another example, suppose that a store is distributing coupons to specific types of customers (e.g., first-time buyers). When a user arrives at the store, if the user and the store both have their own mobile devices, the user may be authenticated to ensure that he/she is in fact a first-time buyer at the store before the couple is sent to the user's mobile device. As a third example, the two users may send each other friend requests from the social-networking system so that they may add each other as their social connections (e.g., friends) at the social-networking system.

In particular embodiments, a group of users may be formed dynamically (e.g., on an ad hoc basis) and a shared space may be dynamically formed among the group of users that enables the users to share information with each other. The shared space may last for as long as the group exists. When the group dissolves, the shared space goes away. The users in the group may be authenticated using the process illustrated in FIG. 1 before sending their information to each other. In addition, an existing group may grow in size (i.e., new users joining the group). For example, suppose that a group initially has three users, and these three users are authenticated using the process illustrated in FIG. 1. Subsequently, two more users wish to join the group. The five users may re-authenticate each other, again using the process illustrated in FIG. 1.

Shared space is described in more detail in U.S. patent application Ser. No. 13/229,241, entitled "Dynamically Created Shared Spaces", filed on Sep. 9, 2011, and U.S. patent application Ser. No. 13/229,550, entitled "Composited Posting Interface for Social Networking System", filed on Sep. 9, 2011, both of which are incorporated by reference in their entirety and for all purposes.

In particular embodiments, the authentication process is completed before the token generated for the first user (e.g., user 240-1) expires. With some implementations, the token expires within 5-10 seconds, which means the entire authentication process is completed within a few seconds. Thereafter, if the first user wishes to share his/her information again, either with the same second user (e.g., user 240-2) or other different users, the first user needs to declare that he/she is in friendly mode again. In response, a new token may be generated for the first user, and the second user or the other users are similarly authenticated before the first user's information is sent to them.

Figure 3:
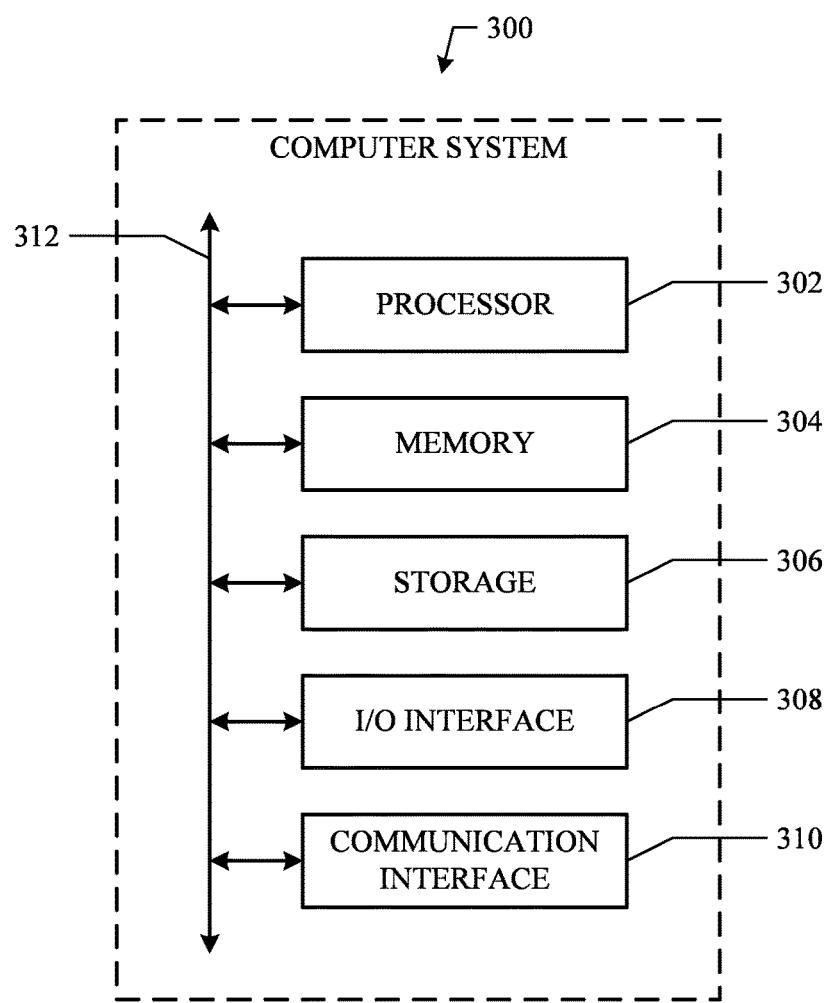
FIG. 3 illustrates an example computer system.

Particular embodiments may be implemented on one or more computer systems. FIG. 3 illustrates an example computer system 300. In particular embodiments, one or more computer systems 300 perform one or more steps of one or more methods described or illustrated herein. In particular embodiments, one or more computer systems 300 provide functionality described or illustrated herein. In particular embodiments, software running on one or more computer systems 300 performs one or more steps of one or more methods described or illustrated herein or provides functionality described or illustrated herein. Particular embodiments include one or more portions of one or more computer systems 300.

This disclosure contemplates any suitable number of computer systems 300. This disclosure contemplates computer system 300 taking any suitable physical form. As example and not by way of limitation, computer system 300 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 300 may include one or more computer systems 300; be unitary or distributed; span multiple locations; span multiple machines; or reside in a cloud, which may include one or more cloud components in one or more networks. Where appropriate, one or more computer systems 300 may perform without substantial spatial or temporal limitation one or more steps of one or more methods described or illustrated herein. As an example and not by way of limitation, one or more computer systems 300 may perform in real time or in batch mode one or more steps of one or more methods described or illustrated herein. One or more computer systems 300 may perform at different times or at different locations one or more steps of one or more methods described or illustrated herein, where appropriate.

In particular embodiments, computer system 300 includes a processor 302, memory 304, storage 306, an input/output (I/O) interface 308, a communication interface 310, and a bus 312. Although this disclosure describes and illustrates a particular computer system having a particular number of particular components in a particular arrangement, this disclosure contemplates any suitable computer system having any suitable number of any suitable components in any suitable arrangement.

In particular embodiments, processor 302 includes hardware for executing instructions, such as those making up a computer program. As an example and not by way of limitation, to execute instructions, processor 302 may retrieve (or fetch) the instructions from an internal register, an internal cache, memory 304, or storage 306; decode and execute them; and then write one or more results to an internal register, an internal cache, memory 304, or storage 306. In particular embodiments, processor 302 may include one or more internal caches for data, instructions, or addresses. This disclosure contemplates processor 302 including any suitable number of any suitable internal caches, where appropriate. As an example and not by way of limitation, processor 302 may include one or more instruction caches, one or more data caches, and one or more translation lookaside buffers (TLBs). Instructions in the instruction caches may be copies of instructions in memory 304 or storage 306, and the instruction caches may speed up retrieval of those instructions by processor 302. Data in the data caches may be copies of data in memory 304 or storage 306 for instructions executing at processor 302 to operate on; the results of previous instructions executed at processor 302 for access by subsequent instructions executing at processor 302 or for writing to memory 304 or storage 306; or other suitable data. The data caches may speed up read or write operations by processor 302. The TLBs may speed up virtual-address translation for processor 302. In particular embodiments, processor 302 may include one or more internal registers for data, instructions, or addresses. This disclosure contemplates processor 302 including any suitable number of any suitable internal registers, where appropriate. Where appropriate, processor 302 may include one or more arithmetic logic units (ALUs); be a multi-core processor; or include one or more processors 302. Although this disclosure describes and illustrates a particular processor, this disclosure contemplates any suitable processor.

In particular embodiments, memory 304 includes main memory for storing instructions for processor 302 to execute or data for processor 302 to operate on. As an example and not by way of limitation, computer system 300 may load instructions from storage 306 or another source (such as, for example, another computer system 300) to memory 304. Processor 302 may then load the instructions from memory 304 to an internal register or internal cache. To execute the instructions, processor 302 may retrieve the instructions from the internal register or internal cache and decode them. During or after execution of the instructions, processor 302 may write one or more results (which may be intermediate or final results) to the internal register or internal cache. Processor 302 may then write one or more of those results to memory 304. In particular embodiments, processor 302 executes only instructions in one or more internal registers or internal caches or in memory 304 (as opposed to storage 306 or elsewhere) and operates only on data in one or more internal registers or internal caches or in memory 304 (as opposed to storage 306 or elsewhere). One or more memory buses (which may each include an address bus and a data bus) may couple processor 302 to memory 304. Bus 312 may include one or more memory buses, as described below. In particular embodiments, one or more memory management units (MMUs) reside between processor 302 and memory 304 and facilitate accesses to memory 304 requested by processor 302. In particular embodiments, memory 304 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 304 may include one or more memories 304, where appropriate. Although this disclosure describes and illustrates particular memory, this disclosure contemplates any suitable memory.

In particular embodiments, storage 306 includes mass storage for data or instructions. As an example and not by way of limitation, storage 306 may include an HDD, a floppy disk drive, flash memory, an optical disc, a magneto-optical disc, magnetic tape, or a Universal Serial Bus (USB) drive or a combination of two or more of these. Storage 306 may include removable or non-removable (or fixed) media, where appropriate. Storage 306 may be internal or external to computer system 300, where appropriate. In particular embodiments, storage 306 is non-volatile, solid-state memory. In particular embodiments, storage 306 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 306 taking any suitable physical form. Storage 306 may include one or more storage control units facilitating communication between processor 302 and storage 306, where appropriate. Where appropriate, storage 306 may include one or more storages 306. Although this disclosure describes and illustrates particular storage, this disclosure contemplates any suitable storage.

In particular embodiments, I/O interface 308 includes hardware, software, or both providing one or more interfaces for communication between computer system 300 and one or more I/O devices. Computer system 300 may include one or more of these I/O devices, where appropriate. One or more of these I/O devices may enable communication between a person and computer system 300. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 308 for them. Where appropriate, I/O interface 308 may include one or more device or software drivers enabling processor 302 to drive one or more of these I/O devices. I/O interface 308 may include one or more I/O interfaces 308, where appropriate. Although this disclosure describes and illustrates a particular I/O interface, this disclosure contemplates any suitable I/O interface.

In particular embodiments, communication interface 310 includes hardware, software, or both providing one or more interfaces for communication (such as, for example, packet-based communication) between computer system 300 and one or more other computer systems 300 or one or more networks. As an example and not by way of limitation, communication interface 310 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 310 for it. As an example and not by way of limitation, computer system 300 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 300 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 300 may include any suitable communication interface 310 for any of these networks, where appropriate. Communication interface 310 may include one or more communication interfaces 310, where appropriate. Although this disclosure describes and illustrates a particular communication interface, this disclosure contemplates any suitable communication interface.

In particular embodiments, bus 312 includes hardware, software, or both coupling components of computer system 300 to each other. As an example and not by way of limitation, bus 312 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 312 may include one or more buses 312, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. .sctn.101. Herein, reference to a computer-readable storage medium excludes transitory forms of signal transmission (such as a propagating electrical or electromagnetic signal per se) to the extent that they are not eligible for patent protection under 35 U.S.C. .sctn.101. A computer-readable non-transitory storage medium may be volatile, non-volatile, or a combination of volatile and non-volatile, where appropriate.

This disclosure contemplates one or more computer-readable storage media implementing any suitable storage. In particular embodiments, a computer-readable storage medium implements one or more portions of processor 302 (such as, for example, one or more internal registers or caches), one or more portions of memory 304, one or more portions of storage 306, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA, C, or C++. In particular embodiments, software is expressed in Hyper Text Markup Language (HTML), Extensible Markup Language (XML), or other suitable markup language.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A computer-implemented method comprising:
   receiving, by one or more computing devices, a first friendly-mode signal from a sender mobile device;
   determining in response to receiving the first friendly-mode signal, by the one or more computing devices, one or more physical proximities between the sender mobile device and at least one mobile device associated with one or more users;
   identifying, by the one or more computing devices, one or more recipient candidates from the one or more users based at least in part on information known about the one or more users including a second friendly mode signal received from the at least one mobile device;
   sending, by the one or more computing devices, information about the one or more recipient candidates to the sender mobile device;
   receiving a selection from the sender mobile device of one or more of the recipient candidates to be a recipient of sender information; and
   sending the sender information to the selected one or more of the recipient candidates.

2. The computer-implemented method of claim 1, wherein the information known about the one or more users comprises social-graph information associated with a user of a social network.

3. The computer-implemented method of claim 1, further comprising:
sending one or more challenge questions to the one or more recipient candidates;
receiving one or more answers from the one or more recipient candidates; and
confirming one or more of the recipient candidates as one or more of the recipients based on at least one or more of the received answers.

4. The computer-implemented method of claim 3, wherein the one or more recipient candidates are confirmed as one or more of the recipients only if one or more of the answers are received in a pre-determined period of time.

5. The computer-implemented method of claim 1, further comprising:
presenting one or more identities of one or more of the recipient candidates; and
receiving one or more confirmations indicating that one or more of the recipient candidates are one or more of the recipients.

6. The computer-implemented method of claim 1, further comprising:
generating a token for the sender mobile device; and
specifying an expiration time for the token, wherein one or more of the recipient candidates are confirmed as one or more of the recipients before the token expires.

7. The computer-implemented method of claim 1, further comprising:
maintaining a list of users who currently wish to share their information, wherein each of the listed users is associated with a user identifier, a token, an expiration time for the token, and information to be shared.

8. A system comprising:
one or more processors; and
a memory coupled to the processors comprising instructions executable by the processors, the processors being operable when executing instructions to:
receive a first friendly-mode signal from a sender mobile device;
determine, in response to receiving the first friendly-mode signal, one or more physical proximities between the sender mobile device and at least one mobile device associated with one or more users;
identify one or more recipient candidates from the one or more users based at least in part on information known about the one or more users including a second friendly mode signal received from the at least one mobile device;
send information about the one or more recipient candidates to the sender mobile device;
receive a selection from the sender mobile device of one or more of the recipient candidates to be a recipient of sender information; and
send the sender information to the selected one or more of the recipient candidates.

9. The system of claim 8, wherein the information known about the one or more users comprises social-graph information associated with a user of a social network.

10. The system of claim 8, wherein the one or more processors are further operable when executing the instructions to:
send one or more challenge questions to the one or more recipient candidates;
receive one or more answers from the one or more recipient candidates; and
confirm one or more of the recipient candidates as one or more of the recipients based on at least one or more of the received answers.

11. The system of claim 10, wherein the one or more recipient candidates are confirmed as one or more of the recipients only if one or more of the answers are received in a pre-determined period of time.

12. The system of claim 8, wherein the one or more processors are further operable when executing the instructions to:
present one or more identities of one or more of the recipient candidates; and
receive one or more confirmations indicating that one or more of the recipient candidates are one or more of the recipients.

13. The system of claim 8, wherein the one or more processors are further operable when executing the instructions to:
generate a token for the sender mobile device; and
specify an expiration time for the token, wherein one or more of the recipient candidates are confirmed as one or more of the recipients before the token expires.

14. The system of claim 8, wherein the one or more processors are further operable when executing the instructions to:
maintain a list of users who currently wish to share their information, wherein each of the listed users is associated with a user identifier, a token, an expiration time for the token, and information to be shared.

15. At least one non-transitory computer-readable storage medium comprising instructions that, when executed, cause a system to:
receive a friendly-mode signal from a sender mobile device;
receive a first friendly-mode signal from a sender mobile device;
determine, in response to receiving the first friendly-mode signal, one or more physical proximities between the sender mobile device and at least one mobile device associated with one or more users;
identify one or more recipient candidates from the one or more users based at least in part on information known about the one or more users including a second friendly mode signal received from the at least one mobile device;
send information about the one or more recipient candidates to the sender mobile device;
receive a selection from the sender mobile device of one or more of the recipient candidates to be a recipient of sender information; and
send the sender information to the selected one or more of the recipient candidates.

16. The non-transitory computer-readable storage medium of claim 15, wherein the information known about the one or more users comprises social-graph information associated with a user of a social network.

17. The non-transitory computer-readable storage medium of claim 15, comprising instructions that, when executed, cause the system to:
send one or more challenge questions to the one or more recipient candidates;
receive one or more answers from the one or more recipient candidates; and confirm one or more of the recipient candidates as one or more of the recipients based on at least one or more of the received answers.

18. The non-transitory computer-readable storage medium of claim 17, wherein the one or more recipient candidates are confirmed as one or more of the recipients only if one or more of the answers are received in a pre-determined period of time.

19. The non-transitory computer-readable storage medium of claim 15, comprising instructions that, when executed, cause the system to:
present one or more identities of one or more of the recipient candidates; and
receive one or more confirmations indicating that one or more of the recipient candidates are one or more of the recipients.

20. The non-transitory computer-readable storage medium of claim 15, comprising instructions that, when executed, cause the system to:
generate a token for the sender mobile device; and
specify an expiration time for the token, wherein one or more of the recipient candidates are confirmed as one or more of the recipients before the token expires.

21. The non-transitory computer-readable storage medium of claim 15, comprising instructions that, when executed, cause the system to:
maintain a list of users who currently wish to share their information, wherein each of the listed users is associated with a user identifier, a token, an expiration time for the token, and information to be shared.

* * * * *